United States Patent
Lim et al.

(10) Patent No.: US 9,979,942 B2
(45) Date of Patent: May 22, 2018

(54) PER PIXEL COLOR CORRECTION FILTERING

(71) Applicant: Apple Inc., Cupertino, CA (US)

(72) Inventors: Suk Hwan Lim, Mountain View, CA (US); D. Amnon Silverstein, Palo Alto, CA (US); David R. Pope, Fremont, CA (US)

(73) Assignee: Apple Inc., Cupertino, CA (US)

( * ) Notice: Subject to any disclaimer, the term of this patent is extended or adjusted under 35 U.S.C. 154(b) by 96 days.

(21) Appl. No.: 15/198,552

(22) Filed: Jun. 30, 2016

(65) Prior Publication Data

US 2018/0007333 A1    Jan. 4, 2018

(51) Int. Cl.
| | |
|---|---|
| *H04N 9/64* | (2006.01) |
| *G06T 3/40* | (2006.01) |
| *H04N 9/76* | (2006.01) |
| *H04N 9/04* | (2006.01) |
| *G06T 1/20* | (2006.01) |

(52) U.S. Cl.
CPC ............ *H04N 9/646* (2013.01); *G06T 1/20* (2013.01); *G06T 3/4007* (2013.01); *G06T 3/4015* (2013.01); *H04N 9/04* (2013.01); *H04N 9/76* (2013.01)

(58) Field of Classification Search
CPC . H04N 9/646; H04N 9/04; H04N 9/76; G06T 1/20; G06T 3/4007; G06T 3/4015
See application file for complete search history.

(56) References Cited

U.S. PATENT DOCUMENTS

| | | | |
|---|---|---|---|
| 7,072,511 | B2 | 7/2006 | Tan et al. |
| 7,800,698 | B2 | 9/2010 | Quan et al. |
| 7,999,978 | B2 | 8/2011 | Nakamura et al. |
| 8,411,943 | B2 | 4/2013 | Ovsiannikov et al. |
| 8,593,483 | B2 | 11/2013 | Cote et al. |
| 2014/0118579 | A1* | 5/2014 | Kim ...................... H04N 9/045 348/242 |

\* cited by examiner

*Primary Examiner* — Twyler Haskins
*Assistant Examiner* — Fayez Bhuiyan
(74) *Attorney, Agent, or Firm* — Fenwick & West LLP

(57) ABSTRACT

Embodiments relate to color correction circuit operations performed by an image signal processor. The color correction circuit computes optimal color correction matrix on a per-pixel basis and adjusts it based on relative noise standard deviations of the color channels to steer the matrix.

20 Claims, 5 Drawing Sheets

PER PIXEL COLOR CORRECTION FILTERING

BACKGROUND

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

Dedicated hardware components may perform processing algorithms, such as color correction of input. Conventional color correction techniques improve color saturation of the captured image data. However, these conventional techniques often trade-off color saturation for increased noise.

SUMMARY

The embodiments herein describe a color correction circuit that computes color correction matrix (CCM) on a per-pixel basis and adjusts it using relative noise standard deviations of the color channels to steer the matrix. The color correction circuit computes a low-pass version of a composite (RGB) data signal from an image sensor. The low-pass data is normalized based on a noise variance derived from a noise model per pixel per color channel. Using the normalized low pass data, the color correction circuit computes the coefficients of the optimal per-pixel CCM, and mixes the per-pixel CCM output and standard CCM output based on the noise model.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
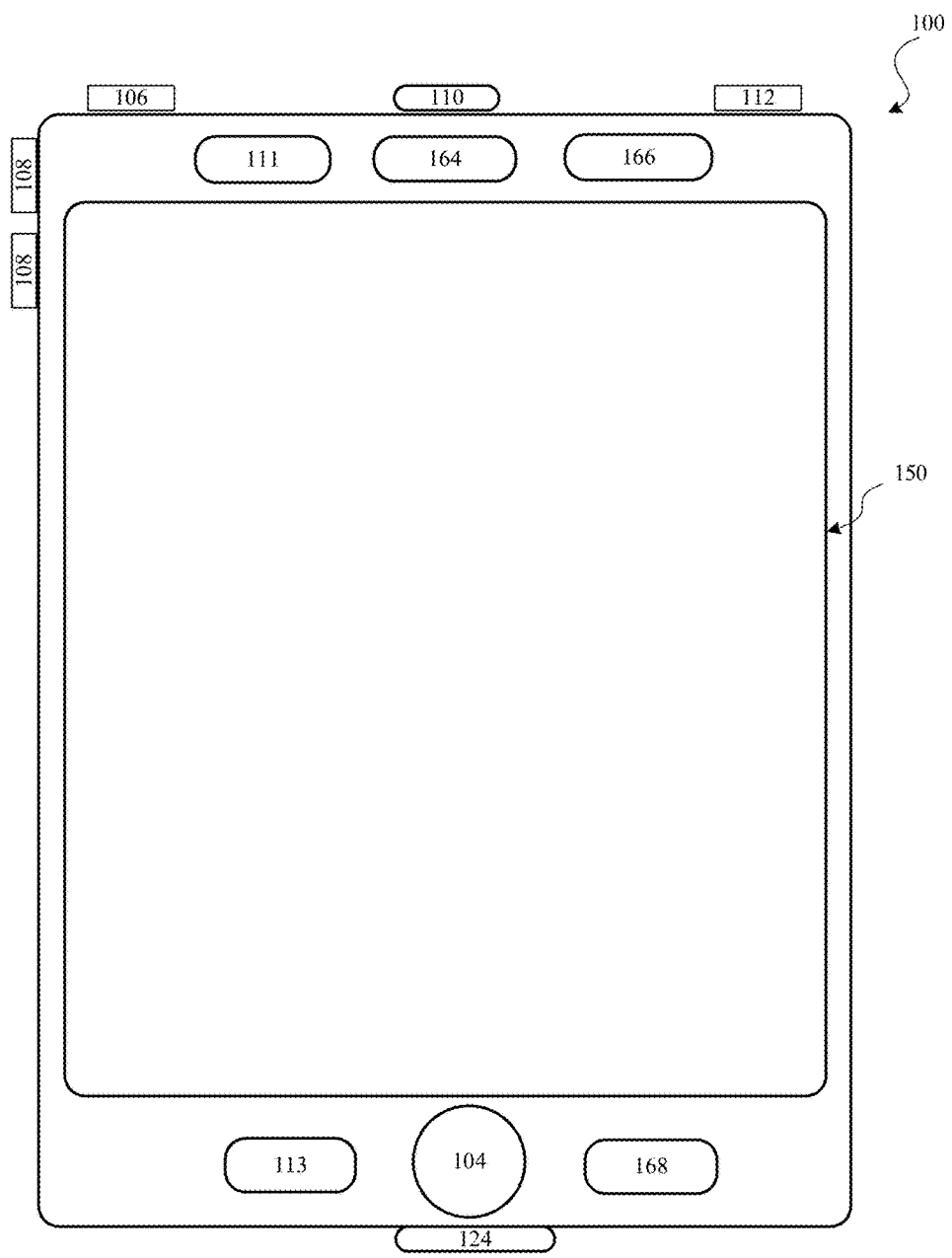
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
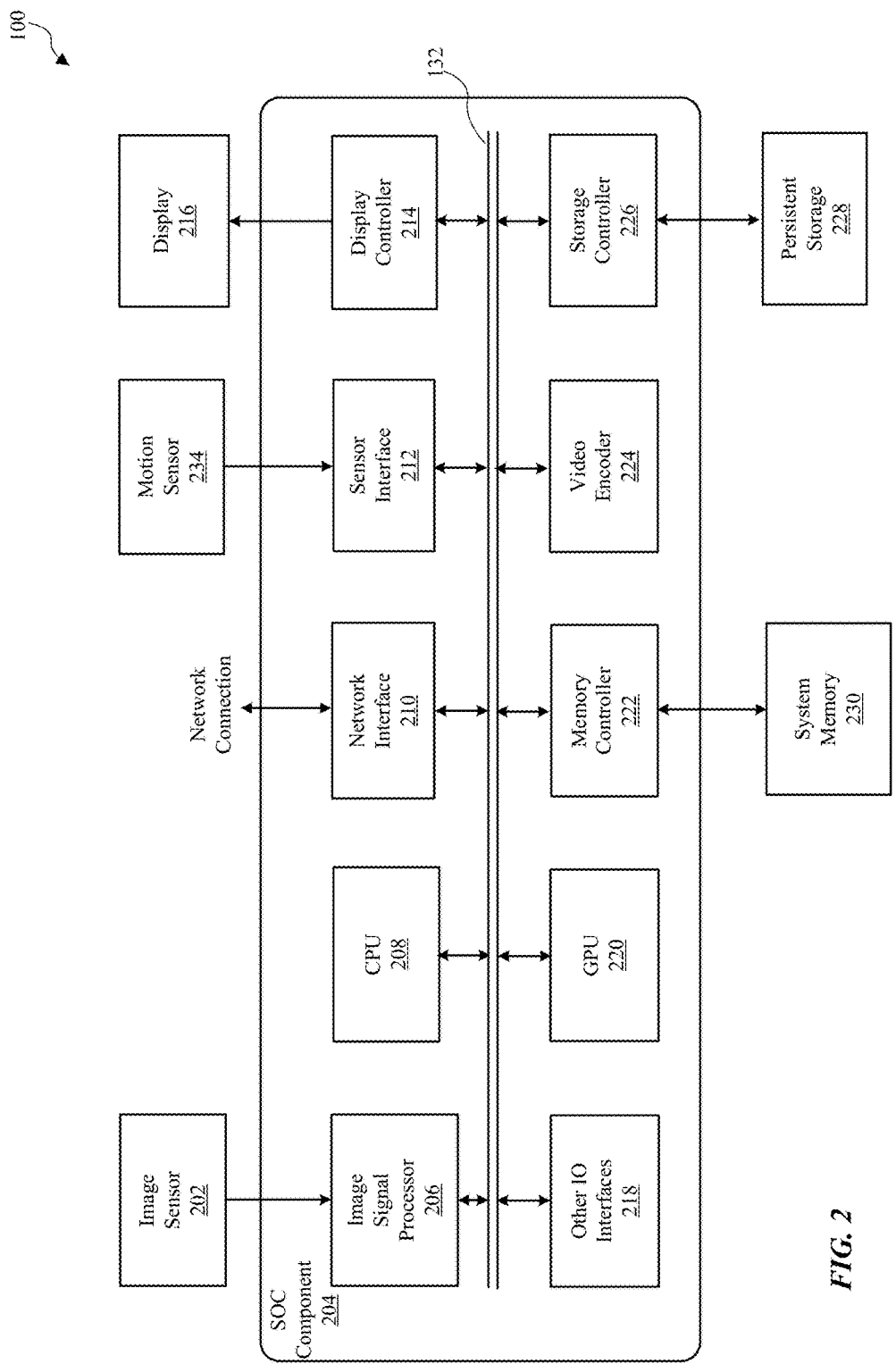
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 108 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
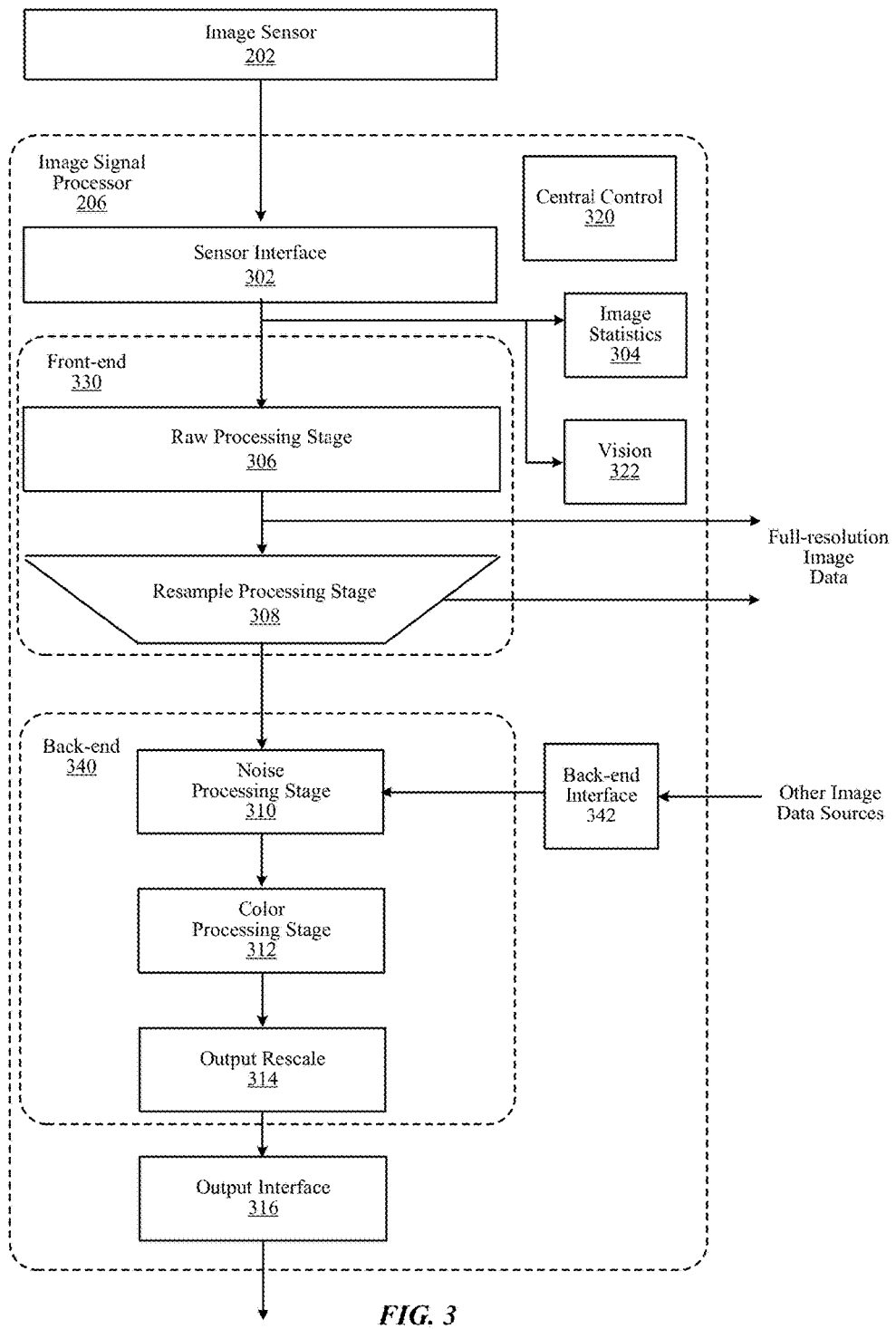
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 106 is coupled to image sensor 202 to receive raw image data. ISP 206 implements an image processing pipeline which may include a set of stages that process image information from creation, capture, or receipt to output. ISP 206 may include, among other components, sensor interface 302, central control 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 308 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 308 may process image data in a Bayer raw format.

The operations performed by raw processing stage 308 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 308 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data, as further described with respect to FIG. 4. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control module 320 to collect different information for the same or different image data.

Vision module 322 performs various operations to facilitate computer vision operations at CPU 208 such as object detection in image data. The vision module 322 may perform various operations including pre-processing, global tone-mapping and Gamma correction, vision noise filtering, resizing, keypoint detection, convolution, and generation of histogram-of-orientation gradients (HOG). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. Convolution is a heavily used tool in image/video processing and machine vision. Convolution may be performed, for example, to generate edge maps of images or smoothen images. HOG provides descriptions of image patches for tasks in image analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. Further description of the vision module 322 is described in FIG. 4.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module 314 may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale module 314 may provide image data via output interface 316 to various other components of system 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Portion of Resample Processing Stage

Figure 4:
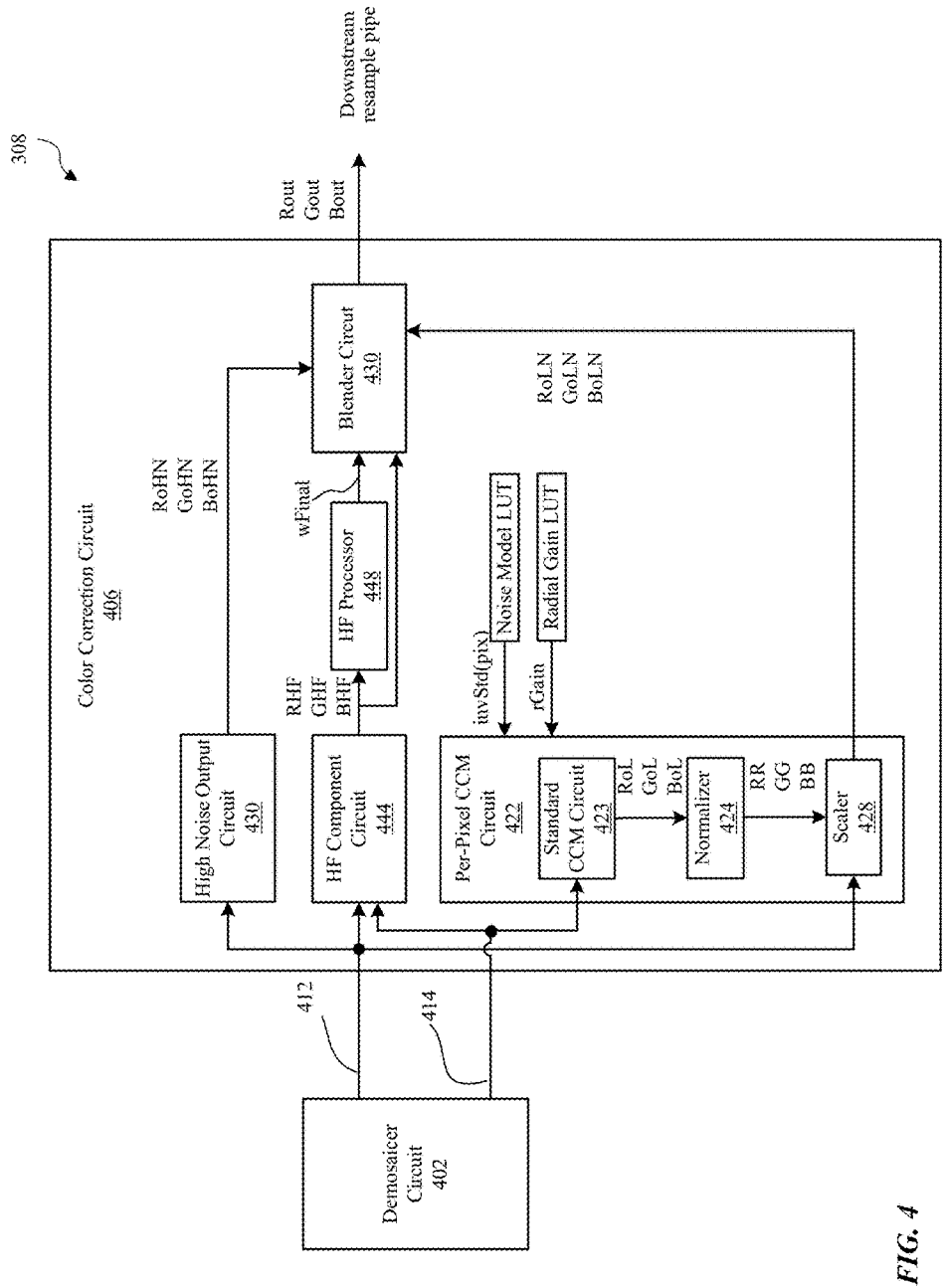
FIG. 4 is a block diagram illustrating a portion of a resample processing pipe of FIG. 3 that includes a color correction circuit, according to one embodiment.

FIG. 4 is a block diagram illustrating a detailed view of a portion of the resample processing stage 308 of FIG. 3 including a color correction circuit 406, according to one embodiment. The color correction circuit 406 computes a color correction matrix on a per-pixel basis using relative noise standard deviations of each data (i.e., color) channel to steer the color correction matrix. When a channel of an input signal (e.g., a red channel) has low signal-to-noise ratio in the input signal (e.g., an image representing a blue sky), a per-pixel color-correction matrix (CCM) (also referred to herein as the "modified color correction matrix") uses less contribution from that channel to generate the final color corrected version of the input signal whereas another channel of higher signal-to-noise ratio contributes more to generate the color corrected version of the input signal.

To compute the enhanced color correction matrix for correcting the colors in the input signal on a per-pixel basis, the color correction circuit 406 computes a noise model per pixel per data channel, computes the coefficients of the per-pixel CCM using the noise model, and mixes the color corrected data channels generated by per-pixel CCM with color corrected data channels generated using the standard CCM output. The standard CCM is a 3×3 RGB transform matrix as commonly known in the art, and detailed description thereof is omitted herein for the sake of brevity.

Embodiments relate to generating and using a per-pixel CCM by obtaining a weighting for each channel that reduces the expected output noise variance. The per-pixel CCM, for example, is a 3×3 matrix of nine variables. Each row of the matrix corresponds to an output channel and the coefficients determine the weights for mixing the three input channels in a manner that reduces the expected output noise variance while satisfying certain conditions. For example, the output of the red channel may be represented by the following equation:

$$Rout = a*Rin + b*Gin + c*Bin \qquad \text{Equation 1}$$

where a, b, c correspond to the coefficients. The coefficients a, b, and c for determining the weights for mixing the three input channels to minimize the expected noise variance for the red channel may be represented as a vector x=[a b c]. In one embodiment, to compute the optimal vector x that reduces the expected noise variance for the red channel, the color correction circuit 406 may model the following function as a quadratic programming problem as well known in the art:

$$\text{noise\_var\_Rout} = a^2*VarR + b^2*VarG + c^2*VarB \qquad \text{Equation 2}$$

where VarR, VarG, and VarB represent the expected noise variance of the red, green, and blue channels for a corresponding pixel.

The noise variance for each color may be derived from the computed invStd, based on the following relationship:

$$\text{invVar}R = clrd(\text{invStd}R * \text{invStd}R) \qquad \text{Equation 3}$$

$$\text{invVar}G = clrd(\text{invStd}G * \text{invStd}G) \qquad \text{Equation 4}$$

$$\text{invVar}B = clrd(\text{invStd}B * \text{invStd}B) \qquad \text{Equation 5}$$

where, invVarR, invVArG, and invVarB represent the inverse variance for the red, green, and blue color per pixel; and clrd is a rounding operation. In one example, the quadratic programming problem may be represented as noise_variance_Rout=x'*Q*x, where Q may be rewritten as $$\begin{pmatrix} VarR & 0 & 0 \\ 0 & VarG & 0 \\ 0 & 0 & VarB \end{pmatrix}$$

Well known optimizing methods may be used to compute coefficients a, b, and c that reduces the function noise_variance_Rout=x'*Q*x, while satisfying the constraint that the smoothed (e.g., filtered) version of the input data applied with the per-pixel CCM results in the same color values as those obtained by applying the smoothed version of the input data with a standard color matrix. The same computation is applied to green and blue channels to generate the coefficients for minimizing the noise variance for each channel, generating a total of 9 coefficients in the per pixel CCM.

The quadratic programming problem presented above with reference to Equations 1 through 5 can be solved using various schemes and methodology. The embodiment described below with reference to FIG. 4 is based on a simplified version of the solution to the quadratic programming problem.

In the embodiment shown in FIG. 4, the demosaicer circuit 402 computes smoothed RGB data signals 414. The smoothed RGB data signal 414 may be low-pass filtered version of RBG data obtained by convolving received RGB data with spatial filter kernels. The RGB data may be raw image data in Bayer pattern from the sensor interface 302. The demosaicer circuit 402 interpolates missing color samples to generate composite RGB data signal 412 where each pixel has red, green, and blue pixel values. In one embodiment, the demosaicer circuit 402 also applies one of six 5×5 spatial filter kernels to raw RGB data in Bayer pattern to generate low-pass version of the composite RGB data signals 414 for each data channel (i.e., red, green, and blue). For this purpose, the demosacier circuit 402 selects the spatial filter kernel to be convolved with the Bayer pixel component and the data channel. The composite demosaic RGB data signals 412 output by the demosaicer circuit 402 is also referred to herein as "composite RGB data signals" and the low-pass version of the composite demosaic RGB data signals 414 is also referred to herein as "low-pass RGB data signals."

The color correction circuit 406 may include, among other components, a high noise output circuit 430, a high-frequency (HF) component circuit 444, a high-frequency (HF) processor 448, a blender circuit 430, a per-pixel CCM circuit 422, a noise model look-up table (LUT), and a radial gain LUT.

The per-pixel CCM circuit 422 computes a per pixel CCM using the low-pass RGB signals 414. For example, the color correction circuit 406 applies the standard CCM to the low-pass RGB signals. To compute RoL, GoL & BoL, the standard CCM is applied to the low-pass signals by the color correction circuit 406 in accordance the following algorithms:

$$RoL = CCM\_00*(RiL + \text{off\_in}[0]) + CCM\_01*(GiL + \text{off\_in}[1]) + CCM\_02*(BiL + \text{off\_in}[2]) + \text{off\_out}[0] \qquad \text{Equation 6}$$

$$GoL = CCM\_10*(RiL + \text{off\_in}[0]) + CCM\_11*(GiL + \text{off\_in}[1]) + CCM\_12*(BiL + \text{off\_in}[2]) + \text{off\_out}[1] \qquad \text{Equation 7}$$

$$BoL = CCM\_20*(RiL + \text{off\_in}[0]) + CCM\_21*(GiL + \text{off\_in}[1]) + CCM\_22*(BiL + \text{off\_in}[2]) + \text{off\_out}[2] \qquad \text{Equation 8}$$

where the input low-pass RBG data signals are denoted as $R_{IL}$, $G_{IL}$, $B_{IL}$. The coefficients (CCM_[0:2 0:2]) represent the coefficients of the standard CCM matrix. The variable off_in[0:2] represents an input offset and off_out[0:2] represents an output offset. In one example, an input offset may compensate for unsigned input data. An output offset may be applied because the computation is performed using signed math, yet the resulting output of the standard CCM applied to the low-pass RGB data signal 414 is an unsigned value.

The per-pixel CCM circuit 422 determines the inverse of the expected noise standard deviation for each pixel and for each color based on signal intensity values of each pixel and color. In other implementations, per-pixel CCM circuit 422 determines the expected noise standard deviation for each pixel and for each color based on signal intensity values of each pixel and color. The noise model LUT maps the inverse of the expected noise standard deviation per pixel to a given a signal intensity value. The noise model LUT represents the noise generated in an image signal by an image sensor. The noise model LUT can be generated, for example, by measuring the noise level in the image signal relative to the intensity values and gain values of sensor signals. In one embodiment, the noise model LUT includes multiple entries for each channel (e.g., invStdRLUT, invStdGLUT, invStdBLUT, corresponding for red, green, and blue channels, respectively). The input samples of the composite RGB data signals are distributed between a certain range of values. Each entry in the noise model LUT is programmed with values invStd (pix), where the pix is the pixel value corresponding to the input sample. For example, for the red channel of the composite RGB data signal, the following values are programmed: invStd(R=0), invStd (R=2048), invStd (R=4096), etc. The color correction circuit 406 may include multiple look-up tables for different gain values.

Using the per-pixel inverse standard deviation, the per-pixel CCM circuit 422 determines the inverse standard deviation invStd for each channel based on inverse standard deviation for each pixel invStdRLUT, invStdGLUT, invStdBLUT as stored in the noise model LUT. In one embodiment, the per-pixel CCM circuit 422 computes the inverse standard deviation for each channel and the per-pixel standard deviation from the noise model LUT in accordance with the following algorithms:

$$\text{invStd}R = \text{interp1}D(R\text{in}, \text{invStd}R\text{LUT})^* r\text{Gain} \quad \text{Equation 9}$$

$$\text{invStd}G = \text{interp1}D(G\text{in}, \text{invStd}G\text{LUT})^* r\text{Gain} \quad \text{Equation 10}$$

$$\text{invStd}B = \text{interp1}D(B\text{in}, \text{invStd}B\text{LUT})^* r\text{Gain} \quad \text{Equation 11}$$

where invStdR, invStdG, and invStdB represent the inverse standard deviation for the red channel, green channel, and blue channel, respectively; interp1D represents a first-order interpolation function for each channel; Rin, Gin, and Bin represent the red, green, and blue pixel values of the composite RGB data signals, respectively; and rGain represents a multiplier for adjusting the standard deviation for noise amplification added during lens shading correction. The value of rGain may be retrieved from a radial gain look-up table (LUT). In one embodiment, the radial gain LUT includes gain values rGain for multiple lens radius values mapped to noise amplification caused by the lens shading correction unit included in the raw processing stage 308. Given a current lens radius value, the color correction circuit 406 linearly interpolates the gain value from the two closest radius values. The resulting gain, which is the reciprocal of the gain applied during lens shading, is applied to the reciprocal of the noise standard deviation at the current pixel.

In another embodiment, the inverse standard deviation for each channel may be computed by interpolating the low-pass RGB data signal and the per-pixel standard deviation determined from the noise model LUT in accordance with the following equations:

$$\text{invStd}R = \text{interp1}D(R_{IL}, \text{invStd}R\text{LUT})^* r\text{Gain} \quad \text{Equation 12}$$

$$\text{invStd}G = \text{interp1}D(G_{IL}, \text{invStd}G\text{LUT})^* r\text{Gain} \quad \text{Equation 13}$$

$$\text{invStd}B = \text{interp1}D(B_{IL}, \text{invStd}B\text{LUT})^* r\text{Gain} \quad \text{Equation 14}$$

where $R_{IL}$, $G_{IL}$, and $B_{IL}$ represent the low-pass R data signal, low-pass G data signal, and low-pass blue data signal, respectively. In low noise situations, the per-pixel CCM circuit 422 may use the actual input pixel values (Rin, Gin, and Bin) to compute the inverse standard deviation. On the other hand, in high noise situations (i.e., higher gains) the per-pixel CCM circuit 422 may use the low pass input values ($R_{IL}$, $G_{IL}$, and $B_{IL}$) to obtain an accurate representation of the noise.

In one embodiment, the per-pixel CCM circuit 422 includes, among other components, a standard CCM circuit 423, a normalizer 424, and a scaler 428. The function of the per-pixel CCM circuit 422 in this embodiment may be described in terms of computing a scale factor applied to the output of the standard CCM matrix applied to the low-pass input. The computation of the scale factor may represent a simplification of the previously described quadratic programming problem.

The standard CCM circuit 423 computes the color-corrected low-pass signal by applying the standard CCM to the low-pass signal 414 received from the demosaicer circuit 402. The resulting output color-corrected low-pass signals for each channel may be represented as RoL, GoL, and BoL, corresponding to the red, green, and blue output color-corrected low-pass signals, respectively.

Normalizer 424 of the color correction circuit 406 normalizes the values of output color-corrected low-pass signals RoL, GoL, and BoL, for each color to the computed variance to generate normalized color-corrected low-pass RGB data RR, GG, BB (for red channel, green channel and blue channel, respectively). The normalized color-corrected low-pass RGB data RR, GG, BB represent the signal to noise variance ratio at each pixel.

Scaler 428 scales the output of the standard CCM applied to the low-pass RGB data signals using a scale factor based on the normalized color-corrected low-pass RGB data RR, GG, BB. The scale factor represents the ratio of the sum of the input components (Rin, Gin, Bin) in the composite RGB data signals relative to the sum of the low frequency components (RiL, GiL, BiL) in the composite RGB data signals, where each channels components are scaled by RR, GG or BB, respectively. In one embodiment, the scaled sum of the input RGB data signals may be computed in accordance with the following algorithm:

$$\text{num} = clrd(clrd(RR^*R\text{in}) + clrd(GG^*G\text{in}) + clrd(BB^*B\text{in})) \quad \text{Equation 15}$$

The scaled sum of low frequency components in the composite RGB data signals may be computed in accordance with the following algorithm:

$$\text{den} = clrd(clrd(RR^*RiL) + clrd(GG^*GiL) + clrd(BB^*BiL)) \quad \text{Equation 16}$$

The scaler 428 of the color correction circuit 406 scales the output of the standard CCM applied to the low-pass RGB data signals (RoL, GoL, and BoL) by the scale factor, computed as scale factor=num/den, generating low-noise output signals RoLN, GoLN, and BoLN for each color.

To compute the final weighting, the high noise output circuit 430 of the color correction circuit 406 applies the standard CCM to the composite RGB data signals 412 output by the demosaicer 402, generating high-noise output signals RoHN, GoHN, and BoHN. For example, the color correction circuit 406 may compute RoHN, GoHN, and BoHN by employing the following algorithms:

$$Ro\text{HN} = \text{CCM\_00}^*(R\text{in} + \text{off\_in}[0]) + \text{CCM\_01}^*(G\text{in} + \text{off\_in}[1]) + \text{CCM\_02}^*(B\text{in} + \text{off\_in}[2]) + \text{off\_out}[0] \quad \text{Equation 17}$$

$$Go\text{HN} = \text{CCM\_10}^*(R\text{in} + \text{off\_in}[0]) + \text{CCM\_11}^*(G\text{in} + \text{off\_in}[1]) + \text{CCM\_12}^*(B\text{in} + \text{off\_in}[2]) + \text{off\_out}[1] \quad \text{Equation 18}$$

$$Bo\text{HN} = \text{CCM\_20}^*(R\text{in} + \text{off\_in}[0]) + \text{CCM\_21}^*(G\text{in} + \text{off\_in}[1]) + \text{CCM\_22}^*(B\text{in} + \text{off\_in}[2]) + \text{off\_out}[2] \quad \text{Equation 19}$$

The blender circuit 430 of the color correction circuit 406 mixes the low-noise output signals RoLN, GoLN, BoLN with a corresponding high-noise output signal RoHN, GoHN, BoHN. Mixing the two signals takes into account the amount of noise in the local area. For areas with low texture (e.g., skies), the blender circuit 430 more heavily weights low-noise output signals compared to high-noise output signals to minimize the output noise. In low textured areas (e.g., an area representing blue sky), the final mixed output should be closer to the low-noise output signals RoLN, GoLN, BoLN. For highly textured areas, the final output is closer to high-noise output signals RoHN, GoHN, BoHN as the goal is to maintain more details. To determine the relative amounts of low-noise and high-noise output signals present in the final mixed output signal, the color correction circuit 406 computes a final weighting.

For each color and for each pixel, high-frequency (HF) component calculator 444 of the color correction circuit 406 computes a high-frequency RGB data signal RHF, GHF and BHF by computing the difference between composite RGB data signal 412 and the low-pass RGB data signal 414.

Using the computed high-frequency RGB data signals, high-frequency (HF) processor 448 of the color correction circuit 406 computes a luminance high frequency data signal (lumHF) and a maximum high-frequency signal (maxHF). The luminance high frequency data signal represents the sum of the high frequency red, green, and blue data signals normalized by the noise standard deviation of the green channel for each pixel. The maximum high-frequency data signal represents the maximum of the high frequency red, green, and blue high frequency data signals normalized by their respective noise standard deviation values for each pixel. Example algorithms for computing lumHF and maxHF are as follows:

$$\text{lumHF} = \text{abs}(R\text{HF} + G\text{HF} + B\text{HF}) * \text{invStd}G \quad \text{Equation 20}$$

$$\text{maxHF} = \max(\max(\text{abs}(R\text{HF}) * \text{invStd}R, \text{abs}(G\text{HF}) * \text{invStd}G), \text{abs}(B\text{HF}) * \text{invStd}B) \quad \text{Equation 21}$$

Using the computed lumHF and maxHF, the HF processor 448 of the color correction circuit 406 computes a weighted luminance high frequency value (wLum) and a weighted maximum high-frequency value (wMax). In one embodiment, the color correction circuit 406 computes wLum value and wMax value by interpolating lumHF with a luminance look-up table as follows:

$$w\text{Lum} = \text{interp1}D(\text{lumHF}, \text{lumLUT}) \quad \text{Equation 22}$$

$$w\text{Max} = \text{interp1}D(\text{maxHF}, \text{maxLUT}) \quad \text{Equation 23}$$

where lumLUT and maxLUT are software programmable functions to go from luminance high frequency to a weight or from maximum high frequency to a weight. The resulting weights are multiplied together to generate the final weight (wFinal), which is used to determine how to blend the low-noise and high-noise color corrected output signals.

The blender circuit 430 of the color correction circuit 406 applies the final weight to the difference between the low-noise output RoLN, GoLN, BoLN and high-noise output RoHN, GoHN, BoHN per color per pixel to compute final output signals Rout, Gout, and Bout. In one embodiment, the color correction circuit 406 computes the final per-pixel color corrected output for each channel as follows:

$$R\text{out} = R\text{oHN} + (R\text{oLN} - R\text{oHN}) * w\text{Final} \quad \text{Equation 24}$$

$$G\text{out} = G\text{oHN} + (G\text{oLN} - G\text{oHN}) * w\text{Final} \quad \text{Equation 25}$$

$$B\text{out} = B\text{oHN} + (B\text{oLN} - B\text{oHN}) * w\text{Final} \quad \text{Equation 26}$$

In one embodiment, the color correction circuit 406 is disabled, in which case the standard CCM is applied the composite RGB data signals 412 to generated Rout, Gout, and Bout.

The circuit as described above with reference to FIG. 4 is merely illustrative. Circuits with various modification may be used to generate the per-pixel color corrected version of the input data.

Example Process of Performing Per-Pixel Color Correction

Figure 5:
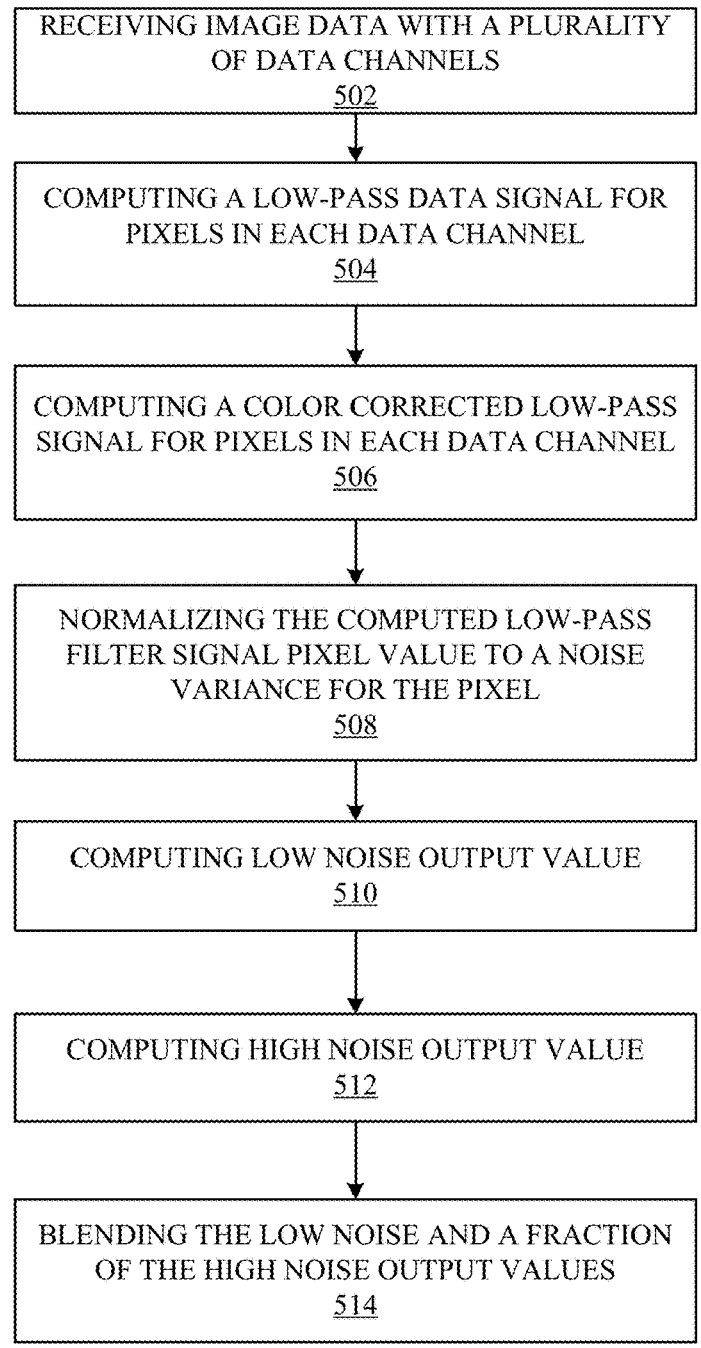
FIG. 5 illustrates a flowchart for performing a per-pixel color correction filtering, according to one embodiment.

FIG. 5 illustrates a flowchart for performing a per-pixel color correction, according to one embodiment. Note that in other embodiments, steps other than those shown in FIG. 5 may be performed.

In embodiment, the demosaicer circuit 402 receives 502 an image data including multiple data channels. Each data channel including several pixels and each pixel has an original pixel value for a specified color corresponding to the data channel. The demosaicer circuit 402 computes 504 composite RGB data signals 412 and low-pass data signals 414 for each pixel included in the image data.

The per-pixel CCM circuit 422 of the color correction circuit 406 receives the low-pass data signals 414 and computes 506 a color corrected low-pass signal for pixels included in each data channel. In one embodiment, the standard CCM circuit 423 in the per-pixel CCM circuit 422 computes the color-corrected low-pass signal RoL, GoL, BoL by applying the standard CCM to the low-pass signal 414 received from the demosaicer circuit 402.

The normalizer 424 normalizes 508 the color-corrected low-pass signal RoL, GoL, and BoL for each pixel and for each data channel to a noise variance value for the channel, to produce normalized color-corrected low-pass RGB data RR, GG, BB. The noise variance value for the channel may be derived from a noise standard deviation value for the channel. To compute the noise standard deviation for each channel, the per-pixel CCM circuit 422 retrieves an inverse standard deviation value for the pixel and the color from the noise model LUT. Using the retrieved per-pixel inverse standard deviation, the color correction circuit 406 computes the inverse standard deviation for each channel. In one embodiment, the color correction circuit 406 computes the per pixel inverse standard deviation for each channel by using the composite RGB data signals 412 to interpolate between the appropriate values in the noise model LUT. In another embodiment, the per pixel inverse standard deviation for each channel may be computed by using the low-pass RGB data signal 414 to interpolate between the appropriate values in the noise model LUT. The normalizer 424, then derives the noise variance for each channel from the computed inverse standard deviation for each channel, and normalizes each channel by the computed noise variance.

The scaler 428 computes coefficients for a per-pixel color correction matrix for each data channel. In the embodiment shown in FIG. 5, the color correction circuit 406 computes the coefficients for a per-pixel CCM by obtaining a weighting for each channel that reduces the expected output noise variance. The scaler 428 computes a scale factor that is applied to the output of the standard CCM applied to the low-pass RGB data signals. The scaler 428 then computes 510 a low-noise output signal RoLN, GoLN, BoLN for each channel by applying the scale factor to each pixel of the normalized color-corrected low-pass RGB data RR, GG, BB.

The high noise output circuit 430 computes 512 a high-frequency output signal RoHN, GoHN, BoHN for blending with the low-noise output signal for each data channel. For example, the color correction circuit 406 computes high-noise output signals RoHN, GoHN, BoHN for each channel by applying the standard CCM to the composite RGB data signals output by the demosaicer circuit 402.

For each channel, the blender circuit 430 blends 514 the low-noise output signals RoLN, GoLN, BoLN and a fraction of the high-noise output signals RoHN, GoHN, BoHN, using a weighting factor wFinal to determine the relative amount of each output signal that should be included in the final blended signal Rout, Gout, Bout. For example, the color correction circuit 406 may apply the final weight wFinal to the difference between the low-noise output and high-noise output per color per pixel to compute final output signal Rout, Gout, and Bout.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. An image signal processor comprising:
   a per-pixel color correction matrix circuit configured to compute a modified color correction matrix for each pixel in image data, and generate first color values by at least applying the modified color correction matrix to the image data, the per-pixel color correction matrix circuit comprising:
      a standard color correction matrix circuit configured to receive a smoothed version of the image data with a plurality of color channels, the standard color correction matrix circuit further configured to apply the standard color correction matrix to the smoothed version of the image data to generate first color-corrected signals, wherein applying the modified color correction matrix to the smoothed version of the image data results in same color values as another smoothed version of the image data applied with a standard color matrix;
      a normalizer circuit configured to normalize the first color-corrected signals to a noise variance value of pixels in the image data to generate normalized color-corrected signals, the noise variance value derived from a noise model of the pixels in the image data, wherein an expected noise variance value of the first color values is lower than another expected noise variance value in color values obtained by applying the standard color matrix to the image data; and
      a scaler circuit configured to compute coefficients of the modified color correction matrix for the pixels in the image data, the scaler circuit further configured to compute first intermediate values as the first color values by applying a scale factor to the smoothed version of the image data, the scale factor based on the normalized color-corrected signals.

2. The image signal processor of claim 1, where the per-pixel color correction matrix circuit further comprises:
   a high frequency component circuit configured to compute second intermediate values corresponding to a difference between the image data and the smoothed version of the image data; and
   a blender circuit configured to blend the first intermediate values and a fraction of second intermediate values.

3. The image signal processor of claim 1, further comprising a demosaicer circuit configured to:
   produce the image data from raw image data in a Bayer pattern; and
   produce the smoothed version of the image data by convolving spatial filter kernels with the raw image data.

4. The image signal processor of claim 3, wherein the demosaicer circuit is configured to produce the smoothed version of the image data by selecting a spatial filter kernel from the spatial filter kernels for a Bayer pixel component of the raw image data and a data channel associated with the Bayer pixel component.

5. The image signal processor of claim 1, wherein the smoothed version of the image data is a low-pass filtered version of the image data.

6. The image signal processor of claim 1, wherein per-pixel color correction matrix circuit is further configured to:
   retrieve an inverse standard deviation value from a noise model look-up table corresponding to the pixels of the image data, the noise model look-up table mapping signal intensity values of pixels to inverse standard deviation values; and
   derive the noise variance value from the inverse standard deviation value retrieved from the noise model look-up table.

7. The image signal processor of claim 1, wherein per-pixel color correction matrix circuit is further configured to:
   retrieve a standard deviation value from a noise model look-up table corresponding to the pixels of the image data, the noise model look-up table mapping signal intensity values of pixels to standard deviation values; and
   derive the noise variance value from the standard deviation value retrieved from the noise model look-up table.

8. The image signal processor of claim 1, wherein the scaler circuit is configured to compute the coefficients of the modified color correction matrix based on the normalized color-corrected signals, the image data, and the smoothed version of the image data.

9. The image signal processor of claim 8, wherein the scaler is configured to:
   determine a scaled sum of image data signals based on the normalized color-corrected signals and the image data;
   determine another scaled sum of a smoothed version of the image data signals based on the normalized color-corrected signals and a smoothed version of the image data signals;
   determine a scale factor based on a ratio of the scaled sum of the image data signals and the other scaled sum of the smoothed version of the image data signals; and
   apply the scale factor to the normalized color-corrected signals.

10. The image signal processor of claim 1, further comprising a high frequency processor configured to:
    determine a luminance high frequency data signal and a maximum high frequency data signal; and
    determine a weight based on the luminance high frequency data signal and the maximum high frequency data signal.

11. The image signal processor of claim 10, wherein a fraction of second intermediate values is determined by applying the weight to the second intermediate values, the method further comprising:
    blending the first intermediate values and the fraction of the second intermediate values.

12. A method of performing color correction on image data with a plurality of color channels, comprising:

computing a modified color correction matrix for each pixel in the image data;
generating first color values by at least applying the modified color correction matrix to the image data;
applying a standard color correction matrix to a smoothed version of the image data to generate first color-corrected signals, wherein applying the modified color correction matrix to the smoothed version of the image data results in same color values as another smoothed version of the image data applied with a standard color matrix;
normalizing the first color-corrected signals to a noise variance value of a pixel in the image data to generate normalized color-corrected signals, the noise variance value derived from a noise model of pixels in the image data, wherein an expected noise variance value of the first color values is lower than another expected noise variance value in color values obtained by applying the standard color matrix to the image data; and
computing first intermediate values as the first color values by applying a scale factor to the smoothed version of the image data, the scale factor based on the normalized color-corrected signals.

13. The method of claim 12, further comprising:
computing second intermediate values corresponding to a difference between the image data and the smoothed version of the image data; and
blending the first intermediate values and a fraction of the second intermediate values.

14. The method of claim 12, further comprising:
producing the image data from a raw image data in a Bayer pattern; and
producing the smoothed version of the image data by convolving spatial filter kernels with the raw image data.

15. The method of claim 14, wherein the smoothed version of the image data is produced by selecting a spatial filter kernel from the spatial filter kernels for a Bayer pixel component of the raw image data and a data channel associated with the Bayer pixel component.

16. The method of claim 12, wherein the smoothed version of the image data is a low-pass filtered version of the image data.

17. The method of claim 12, further comprising:
retrieving an inverse standard deviation value from a noise model look-up table corresponding to each the pixels of the image data, the noise model look-up table mapping signal intensity values of pixels to inverse standard deviation values; and
deriving the noise variance value from the inverse standard deviation value retrieved from the noise model look-up table.

18. The method of claim 12, further comprising:
retrieving a standard deviation value from a noise model look-up table corresponding to the pixels of the image data, the noise model look-up table mapping signal intensity values of pixels to standard deviation values; and
deriving the noise variance value from the standard deviation value retrieved from the noise model look-up table.

19. An electronic device comprising:
an image sensor; and
an image signal processor coupled to the image sensor and configured to receive image data from the image sensor, the image signal processor comprising:
a per-pixel color correction matrix circuit configured to compute a modified color correction matrix for each pixel in the image data, and generate first color values by at least applying the modified color correction matrix to the image data, the per-pixel color correction matrix circuit comprising:
a standard color correction matrix circuit configured to receive a smoothed version of the image data with a plurality of color channels, the standard color correction matrix circuit further configured to apply the standard color correction matrix to the smoothed version of the image data to generate first color-corrected signals, wherein applying the modified color correction matrix to the smoothed version of the image data results in same color values as another smoothed version of the image data applied with a standard color matrix;
a normalizer circuit configured to normalize the first color-corrected signals to a noise variance value of pixels in the image data to generate normalized color-corrected signals, the noise variance value derived from a noise model of the pixels in the image data, wherein an expected noise variance value of the first color values is lower than another expected noise variance value in color values obtained by applying the standard color matrix to the image data; and
a scaler circuit configured to compute coefficients of the modified color correction matrix for the pixels in the image data, the scaler circuit further configured to compute first intermediate values as the first color values by applying a scale factor to the smoothed version of the image data, the scale factor based on the normalized color-corrected signals.

20. The electronic device of claim 19, wherein the per-pixel color correction matrix circuit further comprises:
a high frequency component circuit configured to compute second intermediate values corresponding to a difference between the image data and the smoothed version of the image data; and
a blender circuit configured to blend the first intermediate values and a fraction of the second intermediate values.

* * * * *

UNITED STATES PATENT AND TRADEMARK OFFICE
CERTIFICATE OF CORRECTION

PATENT NO. : 9,979,942 B2
APPLICATION NO. : 15/198552
DATED : May 22, 2018
INVENTOR(S) : Suk Hwan Lim et al.

Page 1 of 1

It is certified that error appears in the above-identified patent and that said Letters Patent is hereby corrected as shown below:

In the Claims

Column no: 18, Line(s):16-17, Claim 6: "wherein per-pixel color correction matrix" to read as —wherein the per-pixel color correction matrix—

Column no: 18, Line(s): 26-27, Claim 7: "wherein per-pixel color correction matrix" to read as —wherein the per-pixel color correction matrix—

Column no: 19, Line(s): 46, Claim 17: "each the pixels" to read as —each of the pixels—

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*